(12) United States Patent
Okamoto et al.

(10) Patent No.: US 12,323,944 B2
(45) Date of Patent: Jun. 3, 2025

(54) POSITION ESTIMATING METHOD, POSITION ESTIMATING PROGRAM, FIXED WIRELESS DEVICE, AND MOBILE WIRELESS DEVICE

(71) Applicant: Panasonic Intellectual Property Management Co., Ltd., Osaka (JP)

(72) Inventors: Mei Okamoto, Kanagawa (JP); Naganori Shirakata, Kanagawa (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 351 days.

(21) Appl. No.: 17/842,332

(22) Filed: Jun. 16, 2022

(65) Prior Publication Data
US 2022/0361139 A1    Nov. 10, 2022

Related U.S. Application Data

(63) Continuation of application No. PCT/JP2020/042143, filed on Nov. 11, 2020.

(30) Foreign Application Priority Data

Dec. 18, 2019 (JP) .................................. 2019-228065

(51) Int. Cl.
*H04W 64/00* (2009.01)

(52) U.S. Cl.
CPC .................................. *H04W 64/00* (2013.01)

(58) Field of Classification Search
CPC ....... H04W 64/00; H04W 24/10; H04W 4/02; H04W 4/029; H04W 84/12; H04W 4/023;
(Continued)

(56) References Cited

U.S. PATENT DOCUMENTS 6,269,246 B1 * 7/2001 Rao ...................... G01S 5/02521
455/456.3
9,553,639 B2 * 1/2017 Babaei ................. H04B 7/0413
(Continued)

FOREIGN PATENT DOCUMENTS

JP      2015-525513 A     9/2015
JP      2016-045022 A     4/2016
(Continued)

OTHER PUBLICATIONS

International Search Report, mailed Dec. 28, 2020, for International Patent Application No. PCT/JP2020/042143 (5 pages including English translation).

*Primary Examiner* — Olumide Ajibade Akonai
(74) *Attorney, Agent, or Firm* — Seed IP Law Group LLP

(57) ABSTRACT

Provided is a position estimation method for a stationary radio device, the method including: calculating a first similarity between a first fingerprint measured by the stationary radio device at a first timing and a second fingerprint measured by a mobile radio device at a second timing and transmitted from the mobile radio device; receiving, from another stationary radio device, a second similarity between a third fingerprint measured by the other stationary radio device at the first timing and the second fingerprint; and determining, a position of the mobile radio device based on a comparison result between the first similarity and the second similarity.

11 Claims, 10 Drawing Sheets

(58) Field of Classification Search
CPC ... H04W 88/02; H04W 4/025; H04W 64/003; H04W 12/79; G01S 5/02526; G01S 5/02521; G01S 5/0252; G01S 5/0278; G01S 5/02524; G01S 5/02525; G01S 5/0284; G01C 21/206; G01C 21/3811
See application file for complete search history.

(56) References Cited

U.S. PATENT DOCUMENTS

| | | | |
|---|---|---|---|
| 2004/0259575 A1* | 12/2004 | Perez-Breva | H04W 64/00 |
| | | | 455/456.5 |
| 2014/0341198 A1 | 11/2014 | Han | |
| 2016/0018507 A1* | 1/2016 | Chen | G01S 5/02524 |
| | | | 455/456.2 |
| 2016/0057583 A1 | 2/2016 | Nguyen et al. | |
| 2016/0094950 A1* | 3/2016 | Millman | H04W 4/026 |
| | | | 455/456.1 |
| 2017/0343638 A1* | 11/2017 | Jampani | G01S 5/02521 |
| 2018/0124586 A1 | 5/2018 | Ikezaki et al. | |
| 2019/0208494 A1 | 7/2019 | Amachi et al. | |

FOREIGN PATENT DOCUMENTS

| | | |
|---|---|---|
| JP | 2016-223854 A | 12/2016 |
| WO | 2018/056149 A1 | 9/2017 |

* cited by examiner

| TRANSMISSION SOURCE ADDRESS | 101 | 102 | 103 | 104 |
|---|---|---|---|---|
| RSSI | −30 | −41 | −42 | −51 |

| TRANSMISSION SOURCE ADDRESS | 101 | 102 | 103 | 104 | OPTION |
|---|---|---|---|---|---|
| RSSI | −29 | −39 | −41 | −51 | |

# POSITION ESTIMATING METHOD, POSITION ESTIMATING PROGRAM, FIXED WIRELESS DEVICE, AND MOBILE WIRELESS DEVICE

TECHNICAL FIELD

The present disclosure relates to a position estimation method, a non-transitory computer-readable recording medium storing therein a position estimation program, a stationary radio device, and a mobile radio device.

BACKGROUND ART

In accordance with the development of radio communication technology and the spread of radio terminals, a demand for position estimation of a radio terminal applying the radio communication technology has been increasing in recent years.

For example, a system has been proposed that estimates, in a wireless mesh network constituted by three or more stationary devices and one mobile device, a location of a mobile device in accordance with the received signal strength indicators obtained when the stationary devices receive a radio signal transmitted by the mobile device (e.g., see WO 2018/056149).

CITATION LIST

Patent Literature

PTL: WO 2018/056149

SUMMARY OF INVENTION

In the system of WO 2018/056149, a position estimation device separate from the mobile device and the stationary device performs the position estimation of the mobile device.

Hence, the system of WO 2018/056149 requires, in addition to the wireless mesh network constituted by the stationary devices and the mobile device, equipment such as a network and a gateway that connect between the wireless mesh network and the position estimation device and thus will be costly.

One non-limiting and exemplary embodiment facilitates providing a position estimation method, a non-transitory computer-readable recording medium storing therein a position estimation program, a stationary radio device, and a mobile radio device each capable of estimating a position of the mobile radio device at low cost.

A position estimation method according to an exemplary embodiment of the present disclosure is for a stationary radio device, the method including: calculating a first similarity between a first fingerprint measured by the stationary radio device at a first timing and a second fingerprint measured by a mobile radio device at a second timing and transmitted from the mobile radio device; receiving, from another stationary radio device, a second similarity between a third fingerprint measured by the other stationary radio device at the first timing and the second fingerprint; and determining, a position of the mobile radio device based on a comparison result between the first similarity and the second similarity.

A non-transitory computer-readable recording medium storing therein a position estimation program according to an exemplary embodiment of the present disclosure is provided, the program causing a stationary radio device to perform processing including: measuring and recording a first fingerprint at a first timing; calculating a first similarity between the first fingerprint and a second fingerprint measured by a mobile radio device at a second timing and transmitted from the mobile radio device; receiving, from another radio device, a second similarity between a third fingerprint measured by the other stationary radio device at the first timing and the second fingerprint; and determining a position of the mobile radio device based on a comparison result between the first similarity and the second similarity.

A stationary radio device according to an exemplary embodiment of the present disclosure includes: control circuitry, which, in operation, calculates a first similarity between a first fingerprint measured by the stationary radio device at a first timing and a second fingerprint measured by a mobile radio device at a second timing and transmitted from the mobile radio device; and communication circuitry, which, in operation, receives, from another radio device, a second similarity between a third fingerprint measured by the other stationary radio device at the first timing and the second fingerprint, wherein the control circuitry determines a position of the mobile radio device based on a comparison result between the first similarity and the second similarity.

A position estimation method according to an exemplary embodiment of the present disclosure is for a mobile radio device, the method including: transmitting a second fingerprint measured by the mobile radio device at a second timing, to a plurality of stationary radio devices; receiving, from the plurality of stationary radio devices, a plurality of similarities between a plurality of fourth fingerprints measured by the plurality of stationary radio devices at a first timing and the second fingerprint; and determining a position of the mobile radio device based on the plurality of similarities.

A non-transitory computer-readable recording medium storing therein a position estimation program according to an exemplary embodiment of the present disclosure is provided, the program causing a mobile radio device to perform processing including: transmitting a second fingerprint measured by the mobile radio device at a second timing, to a plurality of stationary radio devices; receiving, from the plurality of stationary radio devices, a plurality of similarities between a plurality of fourth fingerprints measured by the plurality of stationary radio devices at a first timing and the second fingerprint; and determining a position of the mobile radio device based on the plurality of similarities.

A mobile radio device according to an exemplary embodiment of the present disclosure includes: transmission circuitry, which, in operation, transmits a second fingerprint measured by the mobile radio device at a second timing, to a plurality of stationary radio devices; reception circuitry, which, in operation, receives, from the plurality of stationary radio devices, a plurality of similarities between a plurality of fourth fingerprints measured by the plurality of stationary radio devices at a first timing and the second fingerprint; and control circuitry, which, in operation, determines a position of the mobile radio device based on the plurality of similarities.

It should be noted that general or specific embodiments may be implemented as a system, an apparatus, a method, an integrated circuit, a computer program, a recording medium, or any selective combination thereof.

According to one embodiment of the present disclosure, the position of a mobile radio device can be estimated at low cost.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, an embodiment of the present disclosure will be described in detail with reference to the accompanying drawings as appropriate. However, more detailed description than necessary may be omitted. For example, detailed descriptions of already well-known matters and repeated descriptions for substantially the same configuration may be omitted. This is to prevent the following description from becoming unnecessarily redundant and to facilitate understanding by those skilled in the art.

Note that, the accompanying drawings and the following description are provided so that those skilled in the art understand the present embodiment sufficiently, and are not intended to limit the subject matters recited in the claims.

Figure 1:
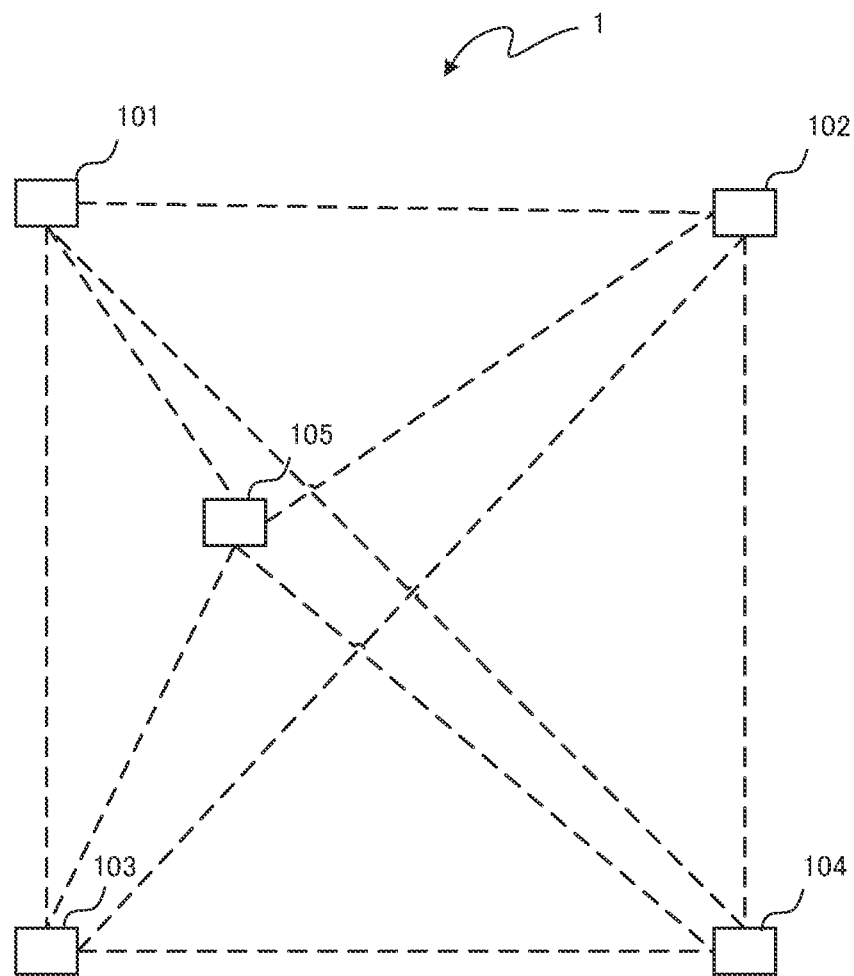
FIG. 1 illustrates an exemplary configuration of a position estimation system according to an embodiment.

FIG. 1 illustrates an exemplary configuration of position estimation system 1 according to the present embodiment. As illustrated in FIG. 1, position estimation system 1 includes radio terminals 101 to 105. Dotted lines illustrated in FIG. 1 indicate interconnections of radio links between radio terminals 101 to 105. Radio terminals 101 to 105 form a mesh network.

Of radio terminals 101 to 105, radio terminals 101 to 104 are fixed at installation positions. On the other hand, radio terminal 105 is, for example, a movable radio terminal carried by a user. Radio terminal 105 is a terminal subject to position estimation.

Radio terminals 101 to 105 may be also referred to as nodes or radio devices. Additionally, radio terminals 101 to 104 of which the installation positions are fixed may be each referred to as an anchor node or a stationary radio device. Radio terminal 105 that is movable may be referred to as a mobile node or a mobile radio device.

Position estimation system 1 is applied to, for example, a worksite such as a plant. In one example, each of radio terminals 101 to 104 that are the anchor nodes (hereinafter may be also referred to as "anchor node radio terminals 101 to 104") is fixed to a workbench installed in a corresponding process of the plant. Radio terminal 105 that is the mobile node (hereinafter may be also referred to as "mobile node radio terminal 105") is carried by a worker (user) who moves from one process to another and performs work at the workbench of each process.

Position estimation system 1 estimates when and in the vicinity of which one of anchor node radio terminals 101 to 104, mobile node radio terminal 105 was positioned. This allows position estimation system 1 to track, for example, which process of work the worker has performed and when. The term "estimation" may be replaced with "determination."

Radio terminals 101 to 105 may transmit the estimated position of radio terminal 105 to, for example, a production management apparatus (not illustrated).

The production management apparatus may analyze a travel path of radio terminal 105 that has been received. That is, the production management apparatus may analyze a behavior of the worker carrying radio terminal 105 and thereby calculate processing for improving working efficiency of the worker.

The configuration of position estimation system 1 is not limited to the example of FIG. 1. For example, the number of anchor nodes may be at least two or more. The number of mobile nodes may be two or more.

Operations of position estimation system 1 are divided into a training operation for acquiring information for the position estimation of radio terminal 105 and a position estimation operation for performing the position estimation of radio terminal 105.

FIGS. 2A to 2D are diagrams for describing overview operations of position estimation system 1 in the training operation. In FIGS. 2A to 2D, elements the same as in FIG. 1 are given the same reference numerals.

Figure 8:
FIG. 8 illustrates an example of a fingerprint.
Figure 9:
FIG. 9 illustrates an example of a saved fingerprint.

Herein, a fingerprint indicates a received strength distribution of radio signals from other radio terminals 101 to 105 in each of radio terminals 101 to 105 (e.g., see FIGS. 8 and 9). A received strength of the received strength distribution may be indicated by, for example, a Received Signal Strength Indicator (RSSI). The fingerprint may be referred to as a fingerprint vector.

In the training operation, anchor node radio terminals 101 to 104 each record (save) a fingerprint obtained when mobile node radio terminal 105 is positioned in the vicinity of each of radio terminals 101 to 104.

Figure 2A:
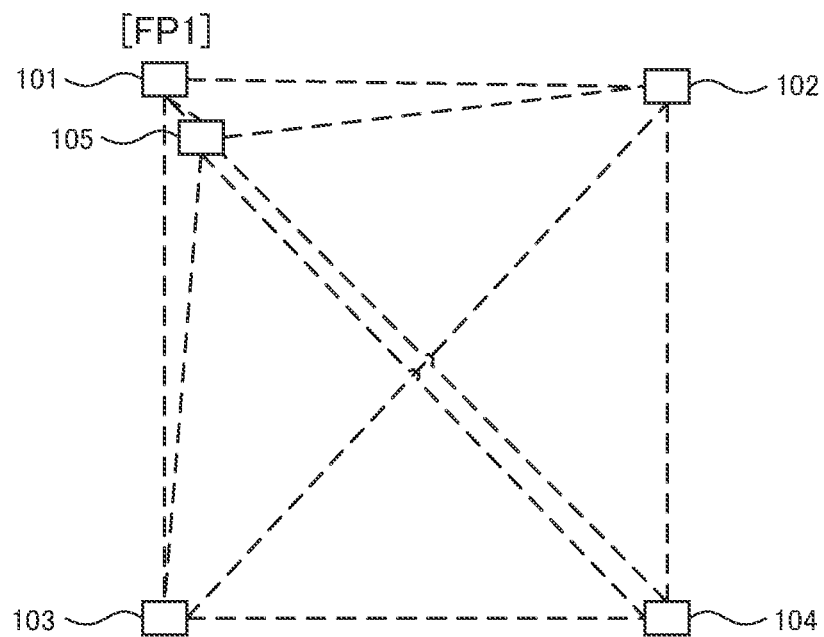
FIG. 2A is a diagram for describing an overview operation of the position estimation system in a training operation.

For example, the user carrying radio terminal 105 moves to the vicinity of radio terminal 101, as illustrated in FIG. 2A. After moving to the vicinity of radio terminal 101, the user operates a switch provided at radio terminal 101 (e.g., presses button).

Operating the switch causes radio terminal 101 to record, for example, fingerprint FP1 that includes, as its elements, the RSSIs of radio signals transmitted from other radio terminals 102 to 105. As a result, fingerprint FP1 obtained when radio terminal 105 is positioned in the vicinity of radio terminal 101 is recorded in radio terminal 101 in advance.

That is, radio terminal 101 records fingerprint FP1 in advance in a case where a distance between radio terminal 105 and radio terminal 101 is closer than a distance between radio terminal 105 and any other radio terminals 102 to 104.

Figure 2B:
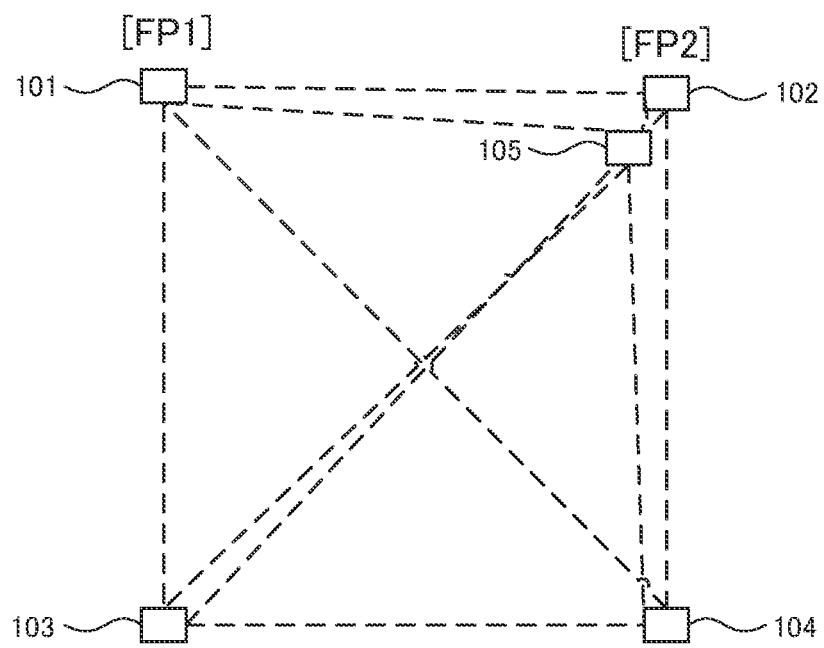
FIG. 2B is another diagram for describing the overview operation of the position estimation system in the training operation.

The user carrying radio terminal 105 then moves to, for example, the vicinity of radio terminal 102, as illustrated in FIG. 2B. After moving to the vicinity of radio terminal 102, the user operates a switch provided at radio terminal 102.

Operating the switch causes radio terminal 102 to record, for example, fingerprint FP2 that includes, as its elements, the RSSIs of radio signals transmitted from other radio terminals 101, and 103 to 105. As a result, fingerprint FP2 obtained when radio terminal 105 is positioned in the vicinity of radio terminal 102 is recorded in radio terminal 102 in advance. That is, radio terminal 102 records fingerprint FP2 in advance in a case where a distance between radio terminal 105 and radio terminal 102 is closer than a distance between radio terminal 105 and any other radio terminals 101, 103, and 104.

Figure 2C:
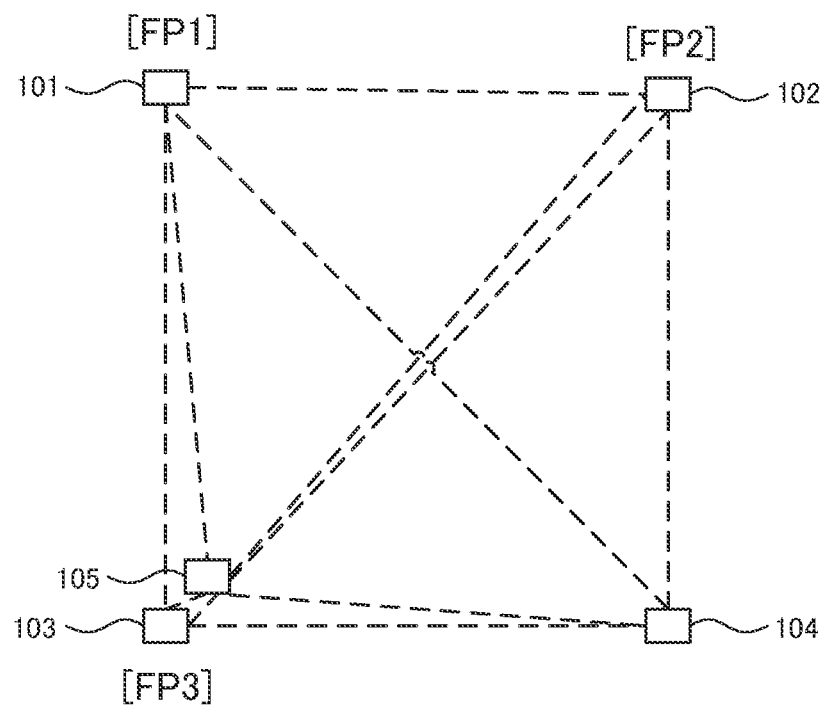
FIG. 2C is still another diagram for describing the overview operation of the position estimation system in the training operation.

The user carrying radio terminal 105 then moves to, for example, the vicinity of radio terminal 103, as illustrated in FIG. 2C. After moving to the vicinity of radio terminal 103, the user operates a switch provided at radio terminal 103.

Operating the switch causes radio terminal 103 to record, for example, fingerprint FP3 that includes, as its elements, the RSSIs of radio signals transmitted from other radio terminals 101, 102, 104, and 105. As a result, fingerprint FP3 obtained when radio terminal 105 is positioned in the vicinity of radio terminal 103 is recorded in radio terminal 103 in advance. That is, radio terminal 103 records fingerprint FP3 in advance in a case where a distance between radio terminal 105 and radio terminal 103 is closer than a distance between radio terminal 105 and any other radio terminals 101, 102, and 104.

Figure 2D:
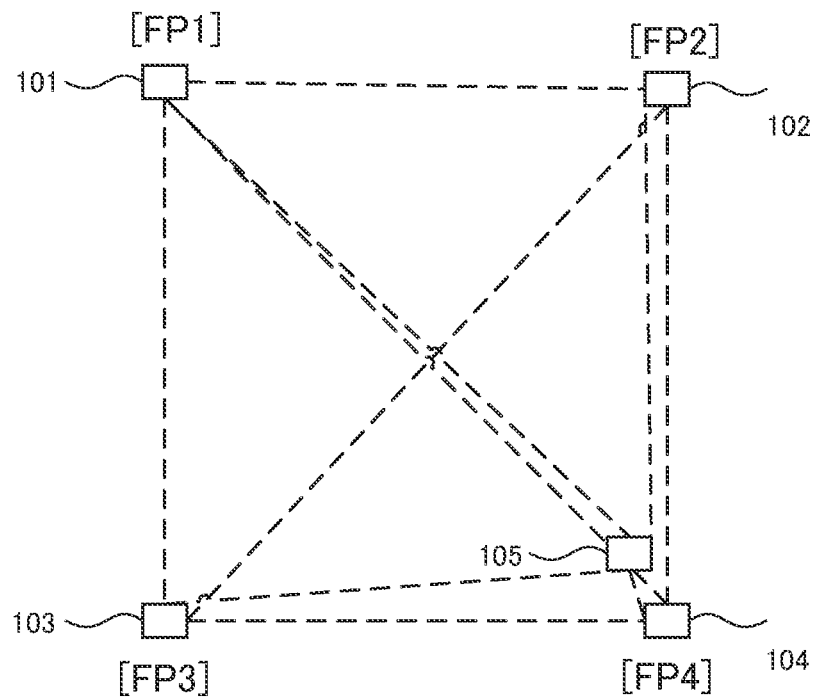
FIG. 2D is yet another diagram for describing the overview operation of the position estimation system in the training operation.

The user carrying radio terminal 105 then moves to, for example, the vicinity of radio terminal 104, as illustrated in FIG. 2D. After moving to the vicinity of radio terminal 104, the user operates a switch provided at radio terminal 104.

Operating the switch causes radio terminal 104 to record, for example, fingerprint FP4 that includes, as its elements, the RSSIs of radio signals transmitted from other radio terminals 101 to 103, and 105. As a result, fingerprint FP4 obtained when radio terminal 105 is positioned in the vicinity of radio terminal 104 is recorded in radio terminal 104 in advance. That is, radio terminal 104 records fingerprint FP3 in advance in a case where a distance between radio terminal 105 and radio terminal 104 is closer than a distance between radio terminal 105 and any other radio terminals 101 to 103.

Thus, the training operation causes anchor node radio terminals 101 to 104 to record fingerprints FP1 to FP4 respectively obtained when mobile node radio terminal 105 is positioned in the vicinity of them (e.g., see FIG. 2D).

Figure 3:
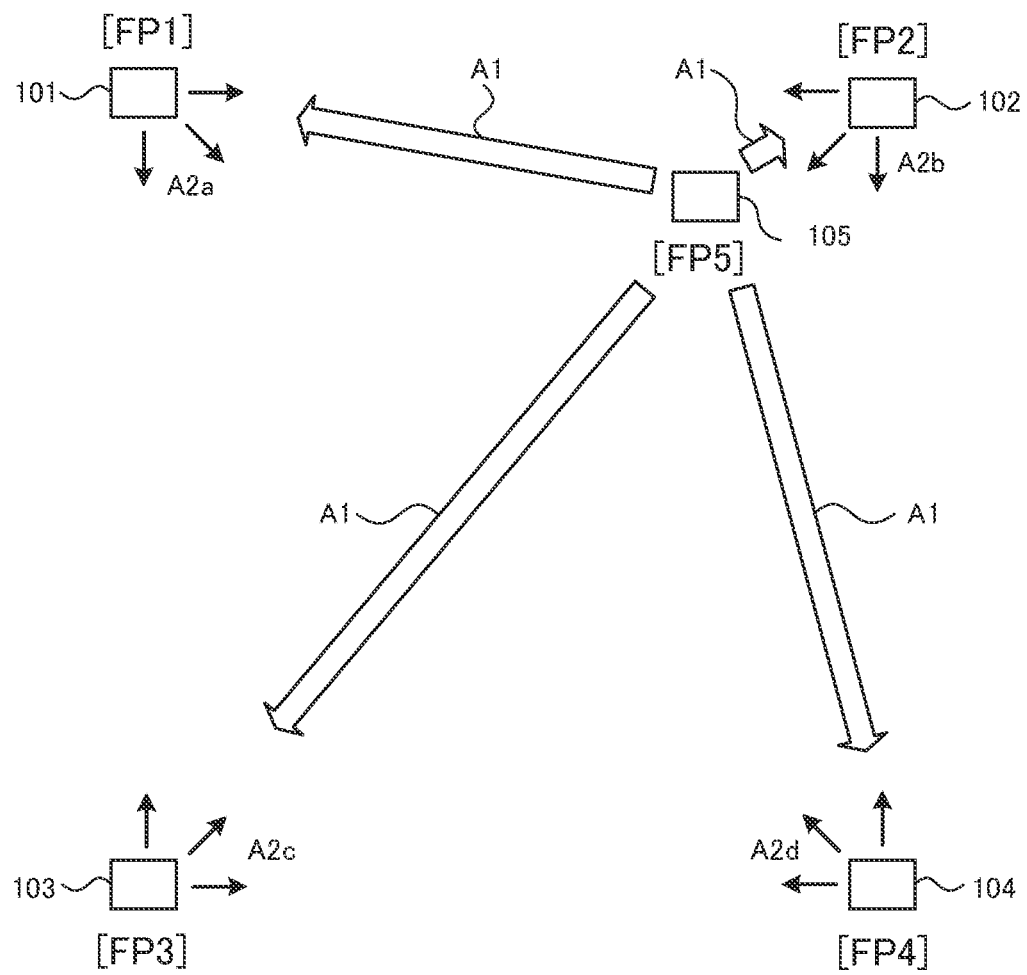
FIG. 3 is a diagram for describing an overview operation of the position estimation system in a position estimation operation.

FIG. 3 is a diagram for describing an overview operation of position estimation system 1 in the position estimation operation. In FIG. 3, elements the same as in FIG. 1 are given the same reference numerals. In FIG. 3, the dotted lines indicating the interconnections of the radio links are not illustrated.

Note that, by the training operation described in FIGS. 2A to 2D, radio terminals 101 to 104 record fingerprints FP1 to FP4 respectively obtained when mobile node radio terminal 105 is positioned in the vicinity of them.

In the position estimation operation, for example, mobile node radio terminal 105 periodically calculates (generates) fingerprint FP5 that includes, as its elements, the RSSIs of radio signals transmitted from anchor node radio terminals 101 to 104. Radio terminal 105 transmits the calculated fingerprint FP5 to respective radio terminals 101 to 104 as indicated by arrows A1.

Each of radio terminals 101 to 104 calculates a similarity between fingerprint FP5 transmitted from radio terminal 105 and a corresponding one of fingerprints FP1 to FP4 recorded in the training operation.

For example, radio terminal 101 calculates a similarity between fingerprint FP5 transmitted from radio terminal 105 and fingerprint FP1 recorded in the training operation. Radio terminal 102 calculates a similarity between fingerprint FP5 transmitted from radio terminal 105 and fingerprint FP2 recorded in the training operation. Radio terminal 103 calculates a similarity between fingerprint FP5 transmitted from radio terminal 105 and fingerprint FP3 recorded in the training operation. Radio terminal 104 calculates a similarity between fingerprint FP5 transmitted from radio terminal 105 and fingerprint FP4 recorded in the training operation.

After calculating the similarity between the fingerprints, each of radio terminals 101 to 104 transmits the calculated similarity between the fingerprints to other radio terminals 101 to 105.

For example, radio terminal 101 broadcasts the calculated similarity to other radio terminals 102 to 105, as illustrated by arrows A2a in FIG. 3. Radio terminal 102 broadcasts the calculated similarity to other radio terminals 101, and 103 to 105, as illustrated by arrows A2b in FIG. 3. Radio terminal 103 broadcasts the calculated similarity to other radio terminals 101, 102, 104, and 105, as illustrated by arrows A2c in FIG. 3. Radio terminal 104 broadcasts the calculated similarity to other radio terminals 101 to 103, and 105, as illustrated by arrows A2d in FIG. 3.

Radio terminals 101 to 105 each estimate the position of radio terminal 105 from the similarities transmitted from other radio terminals 101 to 104. For example, each of radio terminals 101 to 105 estimates that radio terminal 105 is positioned in the vicinity of any of radio terminals 101 to 104 that has transmitted the highest similarity.

For example, assuming a case where the user carrying radio terminal 105 may work at a workbench to which radio terminal 102 is fixed. That is, as illustrated in FIG. 3, radio terminal 105 is assumed to be positioned in the vicinity of radio terminal 102.

In this case, fingerprint FP5 of radio terminal 105 is most similar to fingerprint FP2 recorded in radio terminal 102. That is, in a case where radio terminal 105 is positioned in the vicinity of radio terminal 102, fingerprint FP5 of radio terminal 105 in FIG. 3 is most similar to fingerprint FP2 recorded in radio terminal 102. In other words, the similarity between fingerprint FP5 and fingerprint FP2 is highest compared to other similarities.

Thus, in the example of FIG. 3, each of radio terminals 101 to 105 estimates that radio terminal 105 is positioned in the vicinity of radio terminal 102 that has transmitted the highest similarity.

Incidentally, the training operation may be performed during the position estimation operation. Alternatively, the training operation and the position estimation operation may be performed at different timings. For example, the position estimation operation may be performed after the training operation has been performed. The timing of the training operation may be referred to as a first timing. The timing of the position estimation operation may be referred to as a second timing.

Figure 4:
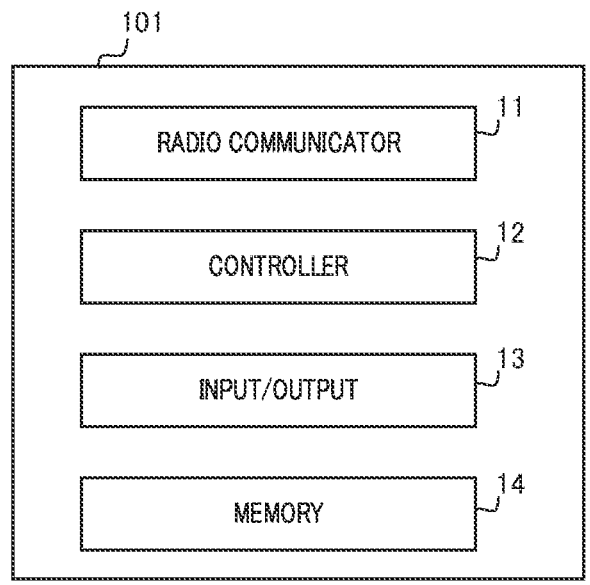
FIG. 4 illustrates an exemplary block configuration of a radio terminal.

FIG. 4 illustrates an exemplary block configuration of radio terminal 101. Radio terminals 101 to 105 have the same block configuration, and thus, the block configuration of radio terminal 101 will be described in FIG. 4.

As illustrated in FIG. 4, radio terminal 101 includes radio communicator 11, controller 12, input/output 13, and memory 14.

Radio communicator 11 (transmitter, receiver) performs radio communication with other radio terminals 102 to 105. The radio communication is, for example, low power communication using the 920 MHz band, IEEE 802.15.4, Zigbee using the 2.4 GHz band, Bluetooth (registered trademark), a wireless LAN (IEEE 802.11b/g/n), a wireless LAN (IEEE 802.11a/ac) or DSRC using the 5 GHz band, a wireless LAN (IEEE 802.11ad) using the 60 GHz band, a private PHS, LTE, or radio communication using 5G. Radio communicator 11 (receiver) outputs received data and RSSI of a received radio signal (received packet). Radio communicator 11 may communicate with the production management apparatus (not illustrated).

Controller 12 controls each component. Controller 12 is composed of, for example, a Central Processing Unit (CPU). Controller 12 performs processing such as transmitting and receiving a packet, recording a fingerprint of the RSSIs of a plurality of transmission sources (radio terminals 102 to 105), calculating similarities between the fingerprints, and estimating a position of radio terminal 105 based on comparison with similarities transmitted from other radio terminal 102 to 104.

Input/output 13 may be, for example, an input device such as a switch and/or a key device. Input/output 13 is also, for example, a sensor device such as an acceleration sensor and/or a human sensor. Further, input/output 13 is also, for example, an output device such as a Light Emitting Diode (LED), a display, and/or a speaker.

Memory 14 records a program for controller 12 to operate. In addition, memory 14 records data for controller 12 to perform calculation processing, data for controller 12 to control each component, or the like. For example, memory 14 records a node list and a fingerprint. Memory 14 may be configured of recording media such as a Random Access Memory (RAM), a Read Only Memory (ROM), a flash memory, and a Hard Disk Drive (HDD).

Figure 5:
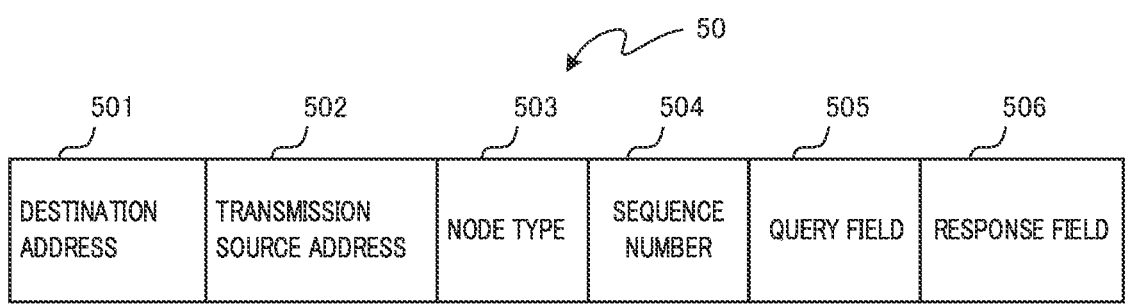
FIG. 5 illustrates an exemplary configuration of a packet.

FIG. 5 illustrates an exemplary configuration of packet 50. Radio terminals 101 to 105 broadcast packet 50 illustrated in FIG. 5 via radio communicator 11 (transmitter). This enables radio terminals 101 to 105 to perform the position estimation of radio terminal 105 in the mesh network.

As illustrated in FIG. 3, packet 50 includes regions of destination address 501, transmission source address 502, node type 503, sequence number 504, query field 505, and response field 506.

Destination address 501 stores therein address information on a radio terminal that is a transmission destination of packet 50. For example, when packet 50 is broadcast, destination address 501 stores a predetermined broadcast address (e.g., All 1). When packet 50 is unicast, destination address 501 stores an address at the radio terminal that is the transmission destination.

Transmission source address 502 stores therein an address of a radio terminal in a transmission source of packet 50.

Node type 503 stores therein node-type information indicating whether the radio terminal that is the transmission source of packet 50 is an anchor node or a mobile node. For example, in a case where radio terminals 101 to 104 transmit packet 50, node type 503 stores node-type information indicating the anchor node. In a case where radio terminal 105 transmits packet 50, node type 503 stores node-type information indicating the mobile node.

The node-type information may be configured by the user at an initial configuration via an input/output such as a key device, for example. The configured node-type information is recorded in a memory of a radio terminal.

Further, the node-type information may be configured to a radio terminal based on, for example, a signal from an input/output such as an acceleration sensor. For example, a controller of a radio terminal determines whether it is an anchor node or a mobile node based on the signal of the acceleration sensor. When determining it is the anchor node, the controller of the radio terminal causes the memory to record the node-type information indicating the anchor node. When determining it is the mobile node, the controller of the radio terminal causes the memory to record the node-type information indicating the mobile node.

Sequence number 504 stores therein a sequence number indicating the order (or identification) of the packets.

Query field 505 stores therein data (query information) related to a query to another radio terminal. For example, radio terminal 105 subject to the position estimation stores the fingerprint at radio terminal 105 in query field 505 and broadcasts it to other radio terminals 101 to 104 (e.g., see arrows A1 in FIG. 3).

Response field 506 stores therein data (response information) related to a response to query from another radio terminal. For example, when the fingerprint is stored in query field 505, each of radio terminals 101 to 104 calculates a similarity between the fingerprint stored in query field 505 and the fingerprint acquired in the training operation. Each of radio terminals 101 to 104 stores the calculated similarity in response field 506 and broadcasts packet 50 (see, e.g., arrows A2a to A2d in FIG. 3). Thus, each of radio terminals 101 to 105 can acquire the similarities of the fingerprints calculated by radio terminals 101 to 104.

In the following, packet 50 is sometimes called a BroadCast (BC) packet.

Figure 6:
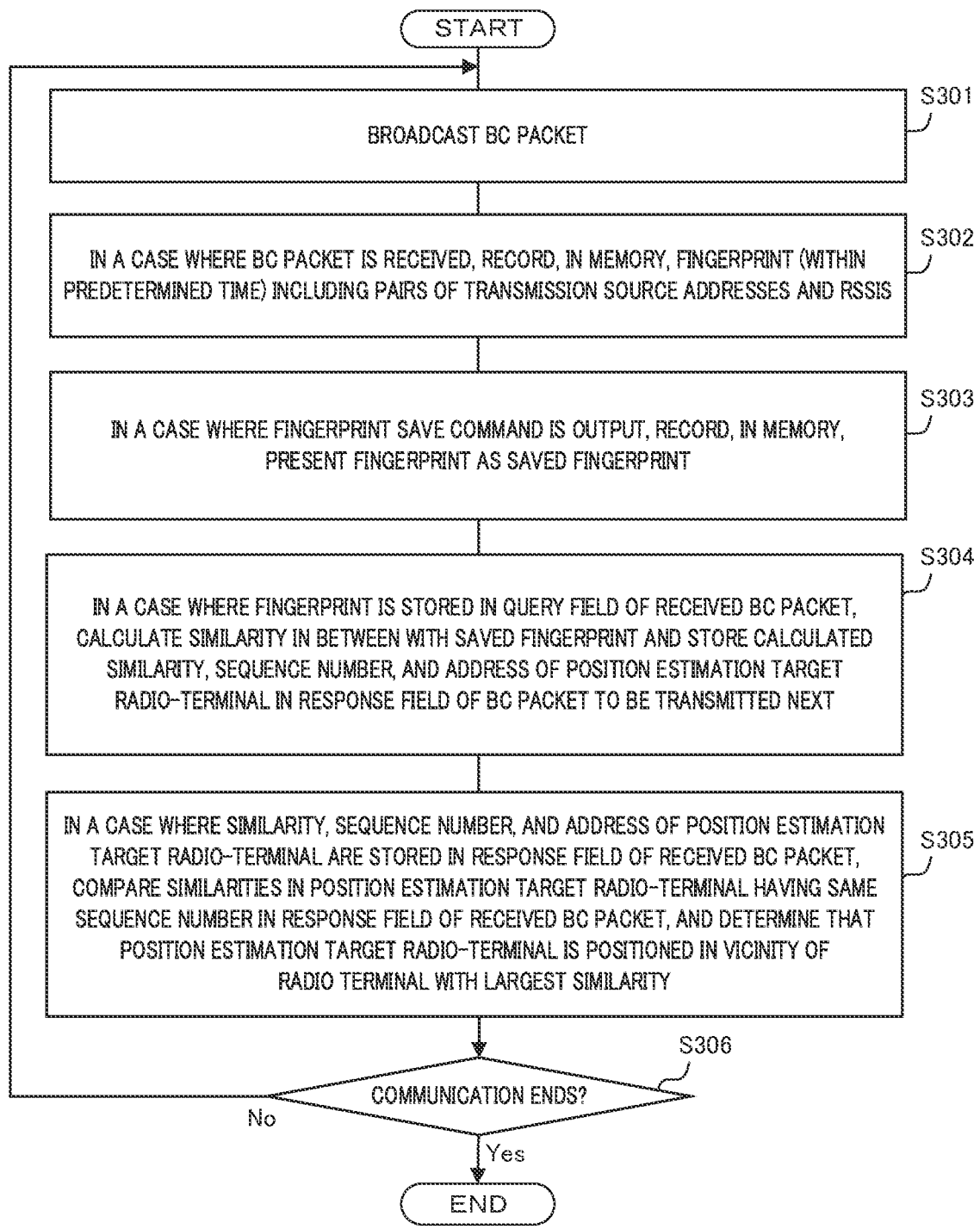
FIG. 6 is a flowchart describing an exemplary operation of the radio terminal that is an anchor node.

FIG. 6 is a flowchart describing an exemplary operation of radio terminal 101 that is an anchor node.

Controller 12 of radio terminal 101 acquires node-type information with reference to memory 14. When the node-type information acquired from memory 14 indicates the anchor node, controller 12 of radio terminal 101 executes processing of the flowchart illustrated in FIG. 6. Incidentally, radio terminal 101 is the anchor node. Accordingly, controller 12 of radio terminal 101 executes the processing of the flowchart illustrated in FIG. 6.

In step S301, controller 12 of radio terminal 101 broadcasts a BC packet via radio communicator 11 (transmitter).

In step S302, in a case where radio communicator 11 (receiver) has received BC packets transmitted by other radio terminals 102 to 105, controller 12 of radio terminal 101 causes memory 14 to record a fingerprint including pairs of transmission source addresses of the received BC packets and RSSIs of the received BC packets.

The fingerprint may be a list (vector) that includes, as its elements, the received strengths of the BC packets transmitted from other radio terminals 102 to 105, the BC packets having been received for a predetermined period of time up to the present (e.g., one second up to the present). Each element of the fingerprint is updated every reception of a BC packet, and thus, the fingerprint includes the most recent elements.

In step S303, for example, in a case where a switch of input/output 13 is pressed and a predetermined signal is output from input/output 13, controller 12 of radio terminal 101 causes memory 14 to record the present fingerprint as a saved fingerprint. The saved fingerprint corresponds to, for example, each of fingerprints FP1 to FP4 described in FIGS. 2A to 2D. In the following, the predetermined signal to be a trigger for recording the saved fingerprint may be referred to as a fingerprint save command.

In step S304, in a case where the fingerprint is stored in query field 505 of a BC packet received by radio communicator 11 (receiver), controller 12 of radio terminal 101 calculates a similarity between the saved fingerprint recorded in memory 14 and the fingerprint stored in query field 505.

Figure 7:
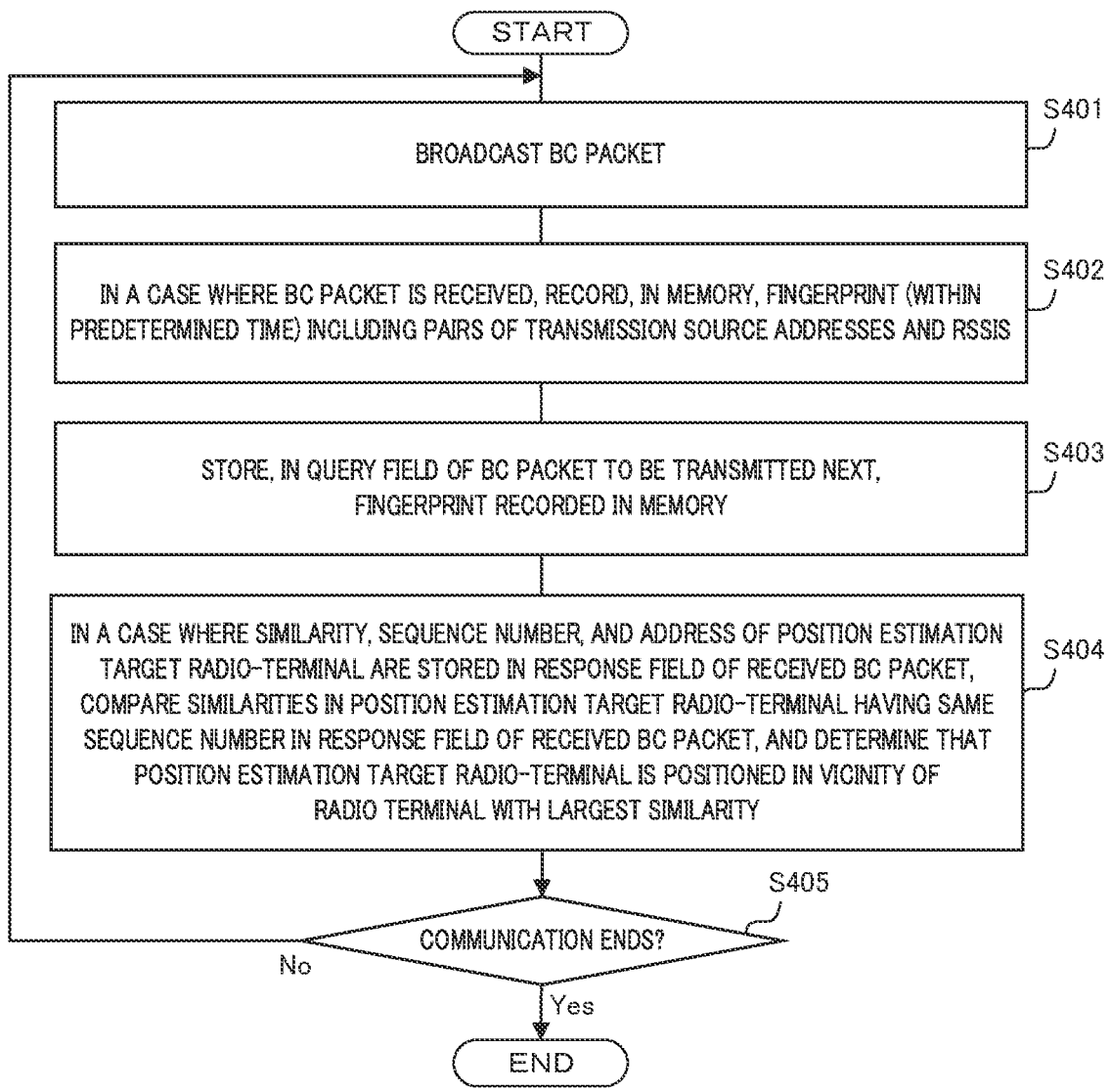
FIG. 7 is a flowchart describing an exemplary operation of the radio terminal that is a mobile node.

Incidentally, mobile node radio terminal 105 stores the fingerprint of radio terminal 105 in query field 505 and broadcasts the BC packet (e.g., see S401 and S403 of FIG. 7). Accordingly, controller 12 of radio terminal 101 calculates a similarity between the saved fingerprint of radio terminal 101 recorded in memory 14 and the fingerprint of radio terminal 105.

After calculating the similarity, controller 12 of radio terminal 101 stores the calculated similarity (score), a sequence number of the received BC packet, and a transmission source address of the received BC packet (address of radio terminal 105 subject to position estimation) in response field 506 of a BC packet to be transmitted next (transmitted in S301).

Similar to radio terminal 101, each of other radio terminals 102 to 104 of anchor nodes calculates a similarity and broadcasts a BC packet storing, in response field 506, the calculated similarity, a sequence number of the received BC packet, and a transmission source address of the received BC packet (address of radio terminal 105 subject to position estimation). This broadcasting enables radio terminal 101 to acquire the similarity between the fingerprints calculated by each of radio terminals 102 to 104, and in the following step S305, radio terminal 101 determines in the vicinity of which one of radio terminals 101 to 104, radio terminal 105 subject to the position estimation is positioned.

In step S305, in a case where the similarity, the sequence number, and the address of radio terminal 105 are stored in response field 506 of a BC packet received by radio communicator 11 (receiver), controller 12 of radio terminal 101 causes memory 14 to record a transmission source address of the received BC packet and response information stored in response field 506.

Controller 12 of radio terminal 101 compares the similarities in radio terminal 105 with response information having the same sequence number (same fingerprint for which query is made to the same position estimation target node at the same time) in the response information recorded in memory 14. Controller 12 of radio terminal 101 then determines that radio terminal 105 is positioned in the vicinity of any of radio terminals 101 to 104 that has the largest similarity. Controller 12 may transmit the determination result of the estimated position of radio terminal 105 to, for example, the external production management apparatus via radio communicator 11.

In step S306, in a case where a communication operation is ended ("Yes" in S306), controller 12 of radio terminal 101 terminates the operation of the flowchart in FIG. 6. In a case where the communication operation is not ended ("No" in S306), controller 12 of radio terminal 101 makes the processing proceed to step S301. A communication termination operation may be performed by the user operating an input/output of any of radio terminals 101 to 105. When receiving the operation from the user via the input/output, each of radio terminals 101 to 105 may transmit a communication termination command to another radio terminal. Each of radio terminals 101 to 105 may determine that the end of the communication operation by receiving the communication termination command from another radio terminal.

Incidentally, radio terminals 102 to 104 are also anchor nodes and execute the processing of the flowchart illustrated in FIG. 6. Radio terminals 101 to 104 may periodically perform the flowchart illustrated in FIG. 6.

FIG. 7 is a flowchart describing an exemplary operation of radio terminal 105 that is a mobile node.

A controller of radio terminal 105 acquires node-type information with reference to a memory. When the node-type information acquired from the memory indicates the mobile node, the controller of radio terminal 105 executes processing of the flowchart illustrated in FIG. 7. Incidentally, radio terminal 105 is the mobile node. Accordingly, the controller of radio terminal 105 executes the processing of the flowchart illustrated in FIG. 7. The controller of radio terminal 105 may periodically perform the processing of the flowchart illustrated in FIG. 7.

The processes in steps S401 and S402 illustrated in FIG. 7 are the same as the processes in steps S301 and S302 described in FIG. 6, and descriptions thereof will be thus omitted.

In step S403, the controller of radio terminal 105 stores the fingerprint recorded in S402 in query field 505 of a BC packet to be transmitted next (transmitted in S401). This storage processing of the fingerprint allows each of anchor node radio terminals 101 to 104 to acquire the fingerprint of mobile node radio terminal 105 and calculate a similarity between the saved fingerprint recorded in the memory and the fingerprint of radio terminal 105 (see, for example, S304 in FIG. 6).

The processes in steps S404 and S405 illustrated in FIG. 7 are the same as the processes in steps S305 and S306 described in FIG. 6, and descriptions thereof will be thus omitted.

FIG. 8 illustrates an example of fingerprint 600. Fingerprint 600 is recorded in the memories of radio terminals 101 to 104 by, for example, the process in step S302 described in FIG. 6. Fingerprint 600 is also recorded in the memory of radio terminal 105 by, for example, the process in step S402 described in FIG. 7.

As illustrated in FIG. 8, fingerprint 600 is configured of a pair of a transmission source address of the transmission source node included in the BC packet and RSSI measured from the BC packet. Fingerprint 600 may include a plurality of pairs of transmission source addresses and RSSIs.

When receiving a BC packet including a new transmission source address, a radio terminal updates fingerprint 600 by adding a pair of the new transmission source address and RSSI. For example, in a case where a new radio terminal is added to position estimation system 1, the radio terminal updates fingerprint 600 by adding a pair of a new transmission source address of the added new radio terminal and RSSI.

When receiving a BC packet including the transmission source address included in fingerprint 600, the radio terminal updates the RSSI corresponding to the transmission source address to the newly measured RSSI.

FIG. 9 illustrates an example of saved fingerprint 700. Saved fingerprint 700 is recorded in the memories of radio terminals 101 to 104 by, for example, the process in step S303 described in FIG. 6.

Saved fingerprint 700 refers to fingerprint 600 recorded in a memory when a fingerprint save command is output from an input/output of a radio terminal.

For example, fingerprint 600 is updated upon a receipt of a BC packet. By contrast, saved fingerprint 700 is updated to fingerprint 600 recorded in the memory, when the fingerprint save command is output from the input/output of the radio terminal.

As illustrated in FIG. 9, saved fingerprint 700 includes an option region. The option region stores a time at which saved fingerprint 700 is updated.

Note that, the radio terminal may transmit fingerprint 600 or saved fingerprint 700 thereof to another radio terminal, by means of an query field in the BC packet. At this time, after receiving the packets transmitted from another radio terminal, the radio terminal may save, in the option region of the saved fingerprint, fingerprints stored in query fields of the received packets, including transmission source addresses.

Thus, the radio terminal may store, in the option region of the saved fingerprint, a fingerprint measured by an anchor node receiving the BC packet from a mobile node, a fingerprint measured when the BC packets are transmitted and received between anchor nodes, in addition to a fingerprint measured by the mobile node. Additionally, the option region may store the address of radio terminal 105 subject to the position estimation.

A calculation example of a similarity between fingerprints will be described.

A similarity between a fingerprint of a mobile node radio terminal subject to position estimation and a saved fingerprint of an anchor node radio terminal may be calculated using a cosine similarity.

For example, the fingerprint of the mobile node radio terminal can be regarded as a vector that includes RSSI its elements. The saved fingerprint of the anchor node radio terminal can be regarded as a vector that includes RSSI its elements. An equation to find the cosine similarity between the fingerprint vector of the mobile node radio terminal and the saved fingerprint vector of the anchor node radio terminal is given by the following Equation 1.

[1]

$$\cos(\vec{a}, \vec{e}) = \frac{\vec{a} \cdot \vec{e}}{|\vec{a}| \cdot |\vec{e}|} \quad \text{(Equation 1)}$$

$\vec{a}$: fingerprint vector of mobile node radio terminal $\vec{e}$: saved fingerprint vector of anchor node radio terminal It can be said that the fingerprint vector of the mobile node radio terminal and the saved fingerprint vector of the anchor node radio terminal are similar as a value of the cosine similarity in Equation 1 approaches one.

A calculation method of the similarity is not limited to the cosine similarity. Other methods may be used to calculate the similarity, such as a reciprocal of the Euclidean distance or the Pearson correlation coefficient.

Figure 10A:
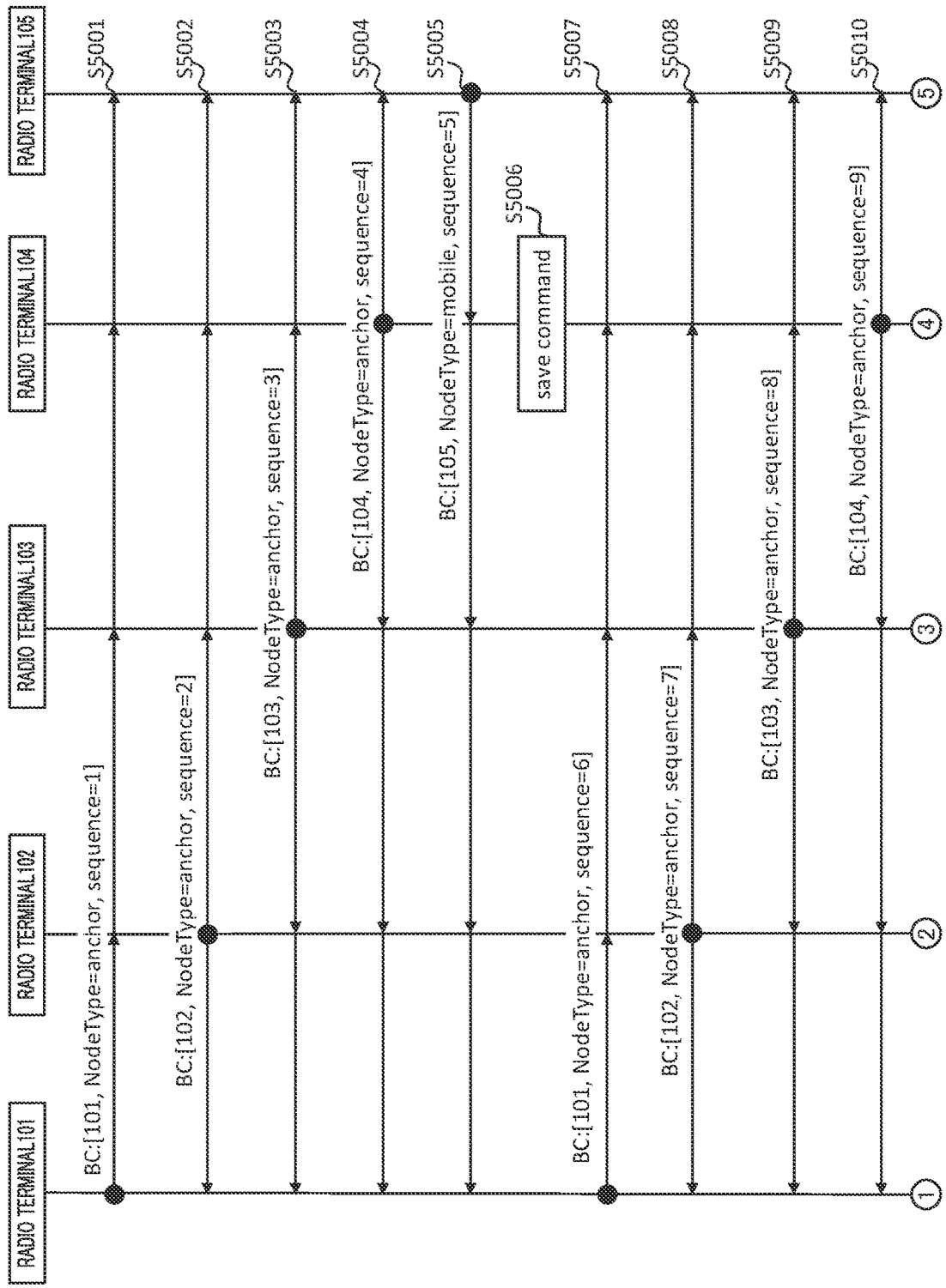
FIG. 10A is a sequence diagram illustrating an exemplary operation of the position estimation system.
Figure 10B:
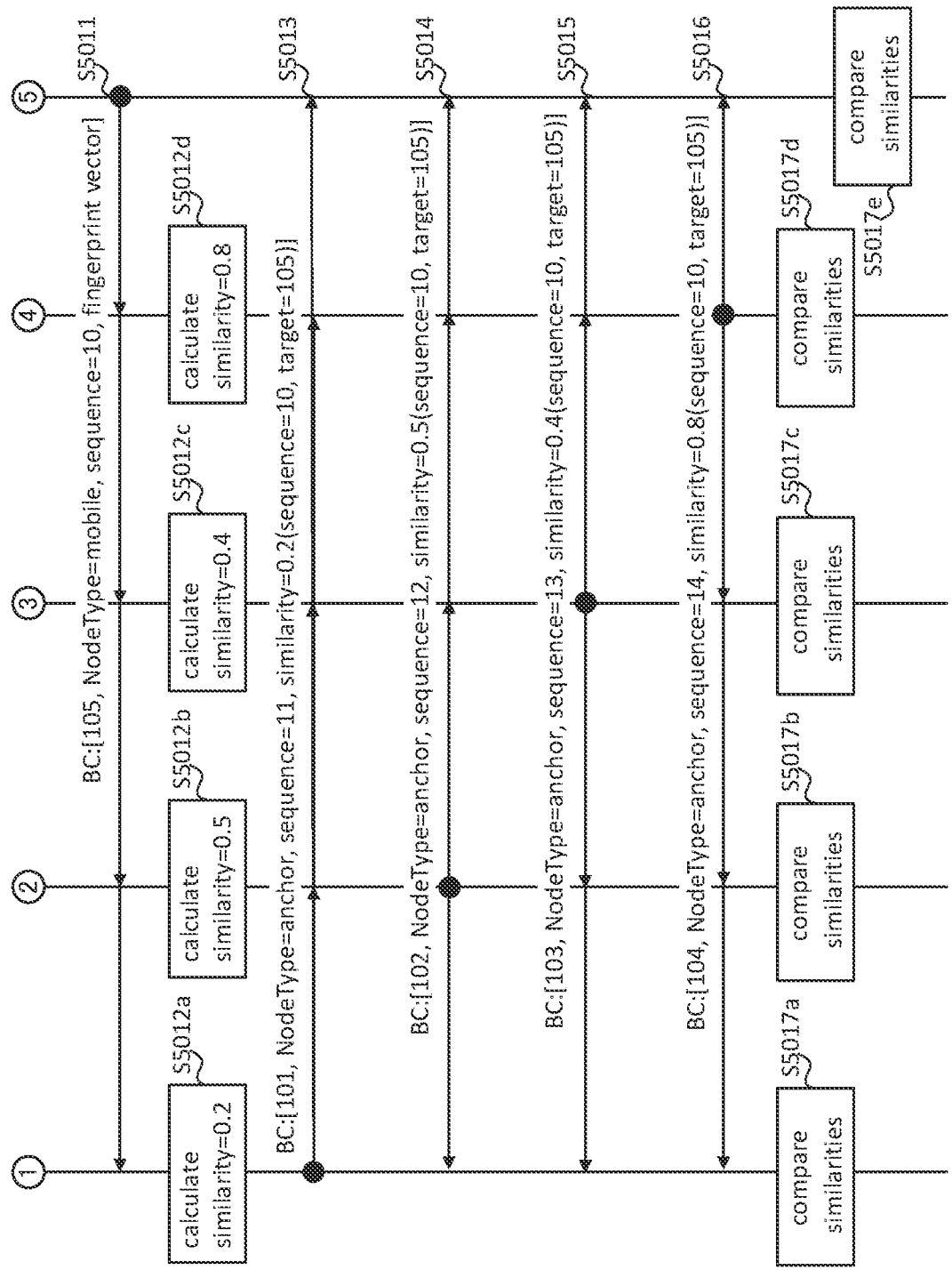
FIG. 10B is another sequence diagram illustrating the exemplary operation of the position estimation system.

FIGS. 10A and 10B are sequence diagrams each illustrating an exemplary operation of position estimation system 1. In FIGS. 10A and 10B, radio terminal 105 is assumed to be positioned in the vicinity of radio terminal 104.

In step S5001, radio terminal 101 transmits a BC packet.

The destination address of the BC packet stores a broadcast address. The transmission source address of the BC packet stores the address of radio terminal 101. The node type of the BC packet stores node-type information indicating an anchor node. The sequence number of the BC packet stores "1."

Each of radio terminals 102 to 105 receives the BC packet transmitted in step S5001 and measures RSSI of the received BC packet. Each of radio terminals 102 to 105 then updates the fingerprint recorded in the memory based on the measured RSSI.

In step S5002, radio terminal 102 transmits a BC packet.

The destination address of the BC packet stores a broadcast address. The transmission source address of the BC packet stores the address of radio terminal 102. The node type of the BC packet stores node-type information indicating an anchor node. The sequence number of the BC packet stores "2."

Each of radio terminals 101, and 103 to 105 receives the BC packet transmitted in step S5002 and measures RSSI of the received BC packet. Each of radio terminals 101, and 103 to 105 then updates the fingerprint recorded in the memory based on the measured RSSI.

In step S5003, radio terminal 103 transmits a BC packet.

The destination address of the BC packet stores a broadcast address. The transmission source address of the BC packet stores the address of radio terminal 103. The node type of the BC packet stores node-type information indicating an anchor node. The sequence number of the BC packet stores "3."

Each of radio terminals 101, 102, 104, and 105 receives the BC packet transmitted in step S5003 and measures RSSI of the received BC packet. Each of radio terminals 101, 102, 104, and 105 then updates the fingerprint recorded in the memory based on the measured RSSI.

In step S5004, radio terminal 104 transmits a BC packet.

The destination address of the BC packet stores a broadcast address. The transmission source address of the BC packet stores the address of radio terminal 104. The node type of the BC packet stores node-type information indicating an anchor node. The sequence number of the BC packet stores "4."

Each of radio terminals 101 to 103, and 105 receives the BC packet transmitted in step S5004 and measures RSSI of the received BC packet. Each of radio terminals 101 to 103, and 105 then updates the fingerprint recorded in the memory based on the measured RSSI.

In step S5005, radio terminal 105 transmits a BC packet.

The destination address of the BC packet stores a broadcast address. The transmission source address of the BC packet stores the address of radio terminal 105. The node type of the BC packet stores node-type information indicating a mobile node. The sequence number of the BC packet stores "5."

Each of radio terminals 101 to 104 receives the BC packet transmitted in step S5005 and measures RSSI of the received BC packet. Each of radio terminals 101 to 104 then updates the fingerprint recorded in the memory based on the measured RSSI.

Here, the user carrying radio terminal 105 operates an input/output of radio terminal 104 (e.g., presses switch).

In step S5006, the input/output of radio terminal 104 outputs a fingerprint save command in response to the operation of the user. Radio terminal 104 records, in the memory, the fingerprint recorded in the memory as the saved fingerprint in response to the output of the fingerprint save command.

In the following, it is assumed that radio terminals 101 to 103 that are the other anchor nodes also record the saved fingerprints in the memories. That is, radio terminal 101 records the saved fingerprint obtained when radio terminal 105 is positioned in the vicinity of radio terminal 101. Radio terminal 102 records the saved fingerprint obtained when radio terminal 105 is positioned in the vicinity of radio terminal 102. Radio terminal 103 records the saved fingerprint obtained when radio terminal 105 is positioned in the vicinity of radio terminal 103.

In steps S5007 to S5010, radio terminals 101 to 104 transmit the BC packet as well as in the processes in steps S5001 to S5004. Thus, each of radio terminals 101 to 104 may measure the most recent RSSI at any time by transmitting and receiving the BC packets to and from each other, and may thereby update fingerprint 600.

In step S5011 of FIG. 10B, radio terminal 105 transmits a BC packet.

The destination address of the BC packet stores a broadcast address. The transmission source address of the BC packet stores the address of radio terminal 105. The node type of the BC packet stores node-type information indicating a mobile node. The sequence number of the BC packet stores "10." The query field of the BC packet stores the fingerprint (the most recent fingerprint) that has been recorded by radio terminal 105.

In step S5012a, radio terminal 101 receives the BC packet transmitted in S5011. The fingerprint of radio terminal 105 is stored in the query field of the BC packet transmitted in S5011. Accordingly, radio terminal 101 calculates a similarity between the fingerprint of radio terminal 105 stored in the query field of the BC packet and the saved fingerprint stored in the memory. Thus, the BC packet transmitted from radio terminal 105 in S5011 serves as a trigger for calculating the similarity (hereinafter may be referred to as a "similarity calculation trigger"), and the sequence number of the BC packet serving as the similarity calculation trigger will be 10.

In step S5012b, radio terminal 102 receives the BC packet transmitted in S5011. The fingerprint of radio terminal 105 is stored in the query field of the BC packet transmitted in S5011. Accordingly, radio terminal 102 calculates a similarity between the fingerprint of radio terminal 105 stored in the query field of the BC packet and the saved fingerprint stored in the memory. Thus, the BC packet transmitted from radio terminal 105 in S5011 serves as the similarity calculation trigger, and the sequence number of the BC packet serving as the similarity calculation trigger will be 10.

In step S5012c, radio terminal 103 receives the BC packet transmitted in S5011. The fingerprint of radio terminal 105 is stored in the query field of the BC packet transmitted in S5011. Accordingly, radio terminal 103 calculates a similarity between the fingerprint of radio terminal 105 stored in the query field of the BC packet and the saved fingerprint stored in the memory. Thus, the BC packet transmitted from radio terminal 105 in S5011 serves as the similarity calculation trigger, and the sequence number of the BC packet serving as the similarity calculation trigger will be 10.

In step S5012d, radio terminal 104 receives the BC packet transmitted in S5011. The fingerprint of radio terminal 105 is stored in the query field of the BC packet transmitted in S5011. Accordingly, radio terminal 104 calculates a similarity between the fingerprint of radio terminal 105 stored in the query field of the BC packet and the saved fingerprint stored in the memory. Thus, the BC packet transmitted from radio terminal 105 in S5011 serves as the similarity calculation trigger, and the sequence number of the BC packet serving as the similarity calculation trigger will be 10.

Note that, as described above, mobile node radio terminal 105 is positioned in the vicinity of radio terminal 104 of anchor node. Hence, the similarity calculated by radio terminal 104 will be highest. For example, in the example of FIG. 10B, the similarity in radio terminal 101 is "0.2." The similarity in radio terminal 102 is "0.5." The similarity in radio terminal 103 is "0.4." The similarity in radio terminal 104 is "0.8."

In step S5013, radio terminal 101 transmits a BC packet. That is, radio terminal 101 receives the BC packet storing the fingerprint in the query field and transmits a BC packet for response after calculating the similarity.

The destination address of the BC packet stores a broadcast address. The transmission source address of the BC packet stores the address of radio terminal 101. The node type of the BC packet stores node-type information indicating an anchor node. The sequence number of the BC packet stores 11. The response field of the BC packet stores the similarity calculated in S5012a, the sequence number of the BC packet serving as the similarity calculation trigger (sequence number 10 of the BC packet transmitted in S5011), and the address of the mobile node at which the similarity has been calculated (address of radio terminal 105).

Radio terminals 102 to 105 that have received the BC packet from radio terminal 101 record the address of radio terminal 101 and the response information stored in the response field of the BC packet in memory 14 in association with each other.

In step S5014, radio terminal 102 transmits a BC packet. That is, radio terminal 102 receives the BC packet storing the fingerprint in the query field and transmits a BC packet for response after calculating the similarity.

The destination address of the BC packet stores a broadcast address. The transmission source address of the BC packet stores the address of radio terminal 102. The node type of the BC packet stores node-type information indicating an anchor node. The sequence number of the BC packet stores 12. The response field of the BC packet stores the similarity calculated in S5012b, the sequence number of the BC packet serving as the similarity calculation trigger (sequence number 10 of the BC packet transmitted in S5011), and the address of the mobile node at which the similarity has been calculated (address of radio terminal 105).

Radio terminals 101, and 103 to 105 that have received the BC packet from radio terminal 102 record the address of radio terminal 102 and the response information stored in the response field of the BC packet in the memories in association with each other.

In step S5015, radio terminal 103 transmits a BC packet. That is, radio terminal 103 receives the BC packet storing the fingerprint in the query field and transmits a BC packet for response after calculating the similarity.

The destination address of the BC packet stores a broadcast address. The transmission source address of the BC packet stores the address of radio terminal 103. The node type of the BC packet stores node-type information indicating an anchor node. The sequence number of the BC packet stores 13. The response field of the BC packet stores the similarity calculated in S5012c, the sequence number of the BC packet serving as the similarity calculation trigger (sequence number 10 of the BC packet transmitted in S5011), and the address of the mobile node at which the similarity has been calculated (address of radio terminal 105).

Radio terminals 101, 102, 104, and 105 that have received the BC packet from radio terminal 103 record the address of radio terminal 103 and the response information stored in the response field of the BC packet in the memories in association with each other.

In step S5016, radio terminal 104 transmits a BC packet. That is, radio terminal 104 receives the BC packet storing the fingerprint in the query field and transmits a BC packet for response after calculating the similarity.

The destination address of the BC packet stores a broadcast address. The transmission source address of the BC packet stores the address of radio terminal 104. The node type of the BC packet stores node-type information indicating an anchor node. The sequence number of the BC packet stores 14. The response field of the BC packet stores the similarity calculated in S5012*d*, the sequence number of the BC packet serving as the similarity calculation trigger (sequence number 10 of the BC packet transmitted in S5011), and the address of the mobile node at which the similarity has been calculated (address of radio terminal 105).

Radio terminals 101 to 103, and 105 that have received the BC packet from radio terminal 104 record the address of radio terminal 104 and the response information stored in the response field of the BC packet in the memories in association with each other.

Transmission of the BC packets in steps S5013 to S5016 allows radio terminals 101 to 105 to share the similarities calculated by respective radio terminals 101 to 104.

In step S5017*a*, radio terminal 101 compares the similarities calculated by respective radio terminals 101 to 104. Radio terminal 101 determines that radio terminal 105 is positioned in the vicinity of the radio terminal that has calculated the largest similarity.

Incidentally, regarding a timing at which a radio terminal compares similarities saved in a memory, comparison may be performed periodically when the number of saved similarities reaches a predetermined number or at predetermined time intervals. Alternatively, the similarity comparison may be performed every reception of the BC packet storing the similarity in the response field from another radio terminal, and the response information including the larger similarity (similarity, sequence number of BC packet serving as similarity calculation trigger, and address of position estimation target-node) may be stored in a response field of the BC packet to be transmitted next, and thus transmitted.

Further, regarding a timing for transmitting the broadcast packet describing the similarity score in the response field, transmission may be performed every reception of the similarity from another node and every comparison thereof, or may be performed when a transmission turn comes according to a predetermined order.

For example, in the examples of 10A and 10B, the similarity "0.8" in radio terminal 104 is highest. Accordingly, radio terminal 101 determines that radio terminal 105 is positioned in the vicinity of radio terminal 104.

In steps S5017*b* to S5017*e*, radio terminals 102 to 105 determine that radio terminal 105 is positioned in the vicinity of the radio terminal that has calculated the largest similarity, as in the process in step S5017*a* of radio terminal 101.

Note that, sequence numbers of the BC packets serving as the similarity calculation triggers described in steps S5013 to S5016 are used to distinguish which fingerprint is used to calculate the similarity among fingerprints transmitted by radio terminal 105 by using the query field.

Further, the BC packet transmitted in step S5011 may include, in a region other than the transmission source address region, the address of radio terminal 105 subject to the position estimation.

Further, the transmission order of BC packets may be predetermined or random.

As described above, controller 12 of radio terminal 101 calculates a first similarity between fingerprint FP1 measured by radio terminal 101 at the first timing and fingerprint FP5 measured by radio terminal 105 at the second timing and transmitted from radio terminal 105. Radio communicator 11 receives, from other radio terminals 102 to 104, second similarities between respective fingerprints FP2 to FP4 measured by other radio terminals 102 to 104 at the first timing and fingerprint FP5 of radio terminal 105. Controller 12 determines the position of radio terminal 105 based on a comparison result between the first similarity and each of the second similarities.

Thus, position estimation system 1 can estimate the position of radio terminal 105 in radio terminals 101 to 105 without requiring, for example, equipment such as a network and a gateway for estimating the position of radio terminal 105, and can estimate the position of radio terminal 105 at low cost.

Moreover, radio terminals 101 to 105 have a similar block configuration and estimate the position of radio terminal 105. This allows position estimation system 1 to estimate the position of radio terminal 105 at low cost.

Further, in some cases, an anchor node is repositioned, replaced, or added due to a change in a propagation environment or a failure of a radio terminal. In position estimation system 1, an anchor node can be easily repositioned, replaced, or added.

For example, when an anchor node is added, the added anchor node starts transmitting a BC packet. The added anchor node then receives BC packets from one or more anchor nodes participating in the mesh network and executes processing of the flowchart illustrated in FIG. 6. Thus, position estimation system 1 can easily increase the number of anchor node.

Moreover, position estimation system 1 does not require processing for performing prior communication such as a network participation request between the added anchor node and the server, as compared with a system that collects fingerprints to the server and estimates a position of a mobile node. Position estimation system 1 also does not require processing for indicating additional information on the added anchor node to the existing anchor nodes from the server. Thus, position estimation system 1 can easily increase the number of anchor node.

Further, position estimation system 1 can perform the position estimation, without communicating with the server, as long as communication is possible between anchor nodes participating in the mesh network. This imparts, to position estimation system 1, a high degree of freedom in selecting an adding position.

(Variation 1)

Although radio terminals 101 to 104 record the saved fingerprints in the memories in response to the operation of the input/output by the user, the present disclosure is not limited to this.

For example, radio terminals 101 to 104 may detect that the user carrying radio terminal 105 is positioned in the vicinity thereof by using the human sensor and may record the saved fingerprints in the memories.

Besides, the input/output of radio terminal 105 may accept, from the user, an operation for recording the saved fingerprint. Radio terminal 105 may transmit the fingerprint save command to radio terminals 101 to 104 when the input/output receives the operation from the user. Radio terminals 101 to 104 may record the saved fingerprints in the memories in response to the fingerprint save command transmitted from radio terminal 105.

Further, radio terminal 105 may output a predetermined signal having a short communication distance, for example, from one meter to two meters. When receiving the predetermined signal from radio terminal 105, radio terminals 101 to 104 may record the saved fingerprints in the memories.

(Variation 2)

The processing by which radio terminals 101 to 105 compare the similarities may be executed when the number of similarities saved in the memories reaches a predetermined number. For example, the processes in S5017*a* to S5017*e* illustrated in FIG. 10B may be executed when the number of similarities saved in the memories of radio terminals 101 to 105 reaches the predetermined number.

At this time, each of radio terminals 101 to 105 may calculate a mean value of similarities in each of radio terminals 101 to 104, and compare the calculated mean values of the similarities. Alternatively, each of radio terminals 101 to 105 may extract the similarity with the highest value from the predetermined number of similarities in each of radio terminals 101 to 104 and compare the extracted similarities.

Further, the processing by which the radio terminals compare the similarities may be performed at predetermined time intervals.

Further, radio terminals 101 to 104 may perform the transmission of the BC packets storing similarities in the response fields every reception of the similarities from another terminal and every comparison thereof, or according to a predetermined order of radio terminals 101 to 104.

(Variation 3)

Mobile node radio terminal 105 may record the saved fingerprint in the memory. In a case of recording the saved fingerprint in the memory, radio terminal 105 may store, in the option of the saved fingerprint, the addresses of radio terminals 101 to 104 positioned in the vicinity of radio terminal 105.

This allows radio terminal 105 to save the saved fingerprints of radio terminals 101 to 104 for each of radio terminals 101 to 104 of which radio terminal 105 was located in the vicinity.

Incidentally, the saved fingerprints and addresses of radio terminals 101 to 104 may be indicated, to radio terminal 105, by transmitting packets from radio terminals 101 to 104 issuing the fingerprint save commands. The saved fingerprints and addresses of radio terminals 101 to 104 may also be provided from the input/output of radio terminal 105 as parameters of the fingerprint save commands.

When the fingerprint save commands are issued, radio terminals 101 to 104 record, as the saved fingerprints, the fingerprints each obtained when radio terminal 105 is positioned in the vicinity. On the other hand, radio terminal 105 records, in each of radio terminals 101 to 104, the saved fingerprints respectively recorded when radio terminal 105 was positioned in the vicinity of radio terminals 101 to 104.

In the position estimation processing for radio terminal 105, a similarity of any one of radio terminals 101 to 104 that has calculated the similarity closest to the similarity calculated by radio terminal 105 may be weighted.

(Variation 4)

For the recording of the fingerprint, it may be possible to set a predetermined time to each node or be input as a parameter by the user, as to how long older ones of the RSSIs added in the past are kept recorded.

(Variation 5)

When a transmission source address set as a pair with RSSI to be added is already included in the fingerprints in updating fingerprints, radio terminals 101 to 105 may overwrite with the newly measured RSSI. Additionally, when a transmission source address and a destination address set as a pair with RSSI to be added are already included in the fingerprints in updating fingerprints, radio terminals 101 to 105 may overwrite with the newly measured RSSI. Moreover, each of radio terminals 101 to 105 may record two or more fingerprints by using the sequence number described in the BC packet as an identifier.

(Variation 6)

When updating the fingerprints, radio terminals 101 to 105 may receive fingerprints that include RSSIs older than the RSSIs of the fingerprints recorded at that time.

Thus, radio terminals 101 to 105 may record the sequence numbers, in addition to the transmission source addresses and the RSSIs. When updating the fingerprints, radio terminals 101 to 105 may compare the sequence numbers of the fingerprints recorded in the memories with the sequence numbers of the newly received fingerprints so as to update the fingerprints by using the newly measured RSSIs.

(Variation 7)

Two or more saved fingerprints may be saved in the memory when the fingerprint save command is issued more than once. Further, the saved fingerprint may also be overwritten every issue of a fingerprint save command.

Further, when a plurality of fingerprint save commands is issued, a mean value of a plurality of RSSIs for the plurality of fingerprint save commands may be calculated, and the calculated mean value of the RSSIs may be recorded in the memory as the saved fingerprint.

(Variation 8)

Another anchor node that is not the nearest node of a mobile node may receive the fingerprint save command and may record, instead of the nearest node, the present fingerprint in the option of the saved fingerprint.

At this time, the other anchor node that is not the nearest node of the mobile node may store an address of the nearest node in the option of the saved fingerprint. Thus, the fingerprint recorded as the saved fingerprint can be identified when it is recorded and in the vicinity of which one of anchor nodes, the mobile node was positioned, by using the address of the nearest node stored in the option.

(Variation 9)

As described above, each of anchor nodes and mobile node compares the similarities calculated respectively in the anchor nodes. Each of anchor nodes and mobile node then determines the largest similarity.

In a case where all anchor nodes calculate similarities sufficiently different from each other, the position of the nearest anchor of the mobile node is clearly determined.

However, an indoor propagation environment is easily changed due to objects placed in various places and passages of people, and thus the nearest anchor node of the mobile node does not necessarily calculate the highest similarity for all of fingerprint vectors held at different times.

Further, in a case where similarities of very close values are calculated by different anchor nodes, it is difficult to determine one nearest node.

Hence, an anchor node may calculate weight for a similarity score calculated by itself and store a weighted similarity score in a response field of a broadcast packet to be transmitted next.

The anchor node may hold a determination result history for the nearest node for the last N times, calculate probability of being determined as the next nearest node, and multiply the similarity by the calculated probability as weighting.

The anchor node may weight, with reference to the fixed-installation position information for all anchor nodes, the similarity so that the closer the position thereof is to the most recently determined nearest node, the larger the similarity is, and the farther the position is, the smaller the similarity is.

For this reason, the anchor node may save the installation position information for all anchor nodes in the memory or describe its position information in a broadcast packet transmitted by nodes periodically.

The anchor node may hold an update history of RSSIs configuring the fingerprint vector and weight so that its similarity is reduced in a case where a ratio of RSSIs not updated within a predetermined time exceeds a specified value.

In the description of the embodiment described above, " . . . er (or)" used for each component may be replaced with another term such as " . . . circuit (circuitry)," " . . . assembly," " . . . device," " . . . unit," or " . . . module."

Hereinabove, the embodiment has been described with reference to the drawings, the present disclosure is not limited to such examples. It will be apparent to those skilled in the art may arrive at various modifications or variations at within the scope of the claims, and it is naturally understood that the various modifications or variations are also within the technical scope of the present disclosure. In addition, the components in the above embodiments may be optionally combined without departing from the spirit and scope of the present disclosure.

The present disclosure can be realized by software, hardware, or software in cooperation with hardware. Each functional block used in the description of the embodiment described above can be partly or entirely realized by an LSI such as an integrated circuit, and each process described in the embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Summary of Present Disclosure

A position estimation method for a stationary radio device according to the present disclosure includes: calculating a first similarity between a first fingerprint measured by the stationary radio device at a first timing and a second fingerprint measured by a mobile radio device at a second timing and transmitted from the mobile radio device; receiving, from another stationary radio device, a second similarity between a third fingerprint measured by the other stationary radio device at the first timing and the second fingerprint; and determining, a position of the mobile radio device based on a comparison result between the first similarity and the second similarity.

In the position estimation method according to the present disclosure, the first fingerprint is recorded by the stationary radio device at the first timing in a case where a distance between the mobile radio device and the stationary radio device is shorter than a distance between the mobile radio device and the other stationary radio device; and the third fingerprint is recorded by the other stationary radio device at the first timing in a case where the distance between the mobile radio device and the other stationary radio device is shorter than the distance between the mobile radio device and the stationary radio device.

In the position estimation method according to the present disclosure, the first timing is determined according to a signal output from input/output circuitry provided in the stationary radio device; and the stationary radio device measures and records the first fingerprint at the first timing.

In the position estimation method according to the present disclosure, the first timing is determined according to a signal transmitted from the mobile radio device; and the stationary radio device measures and records the first fingerprint at the first timing.

In the position estimation method according to the present disclosure, the stationary radio device transmits the first similarity to the other stationary radio device.

In the position estimation method according to the present disclosure, in a case where the first similarity calculated by the stationary radio device is a similarity higher than the second similarity received from the other stationary radio device, determining a distance between the mobile radio device and the stationary radio device is shorter than a distance between the mobile radio device and the other stationary radio device.

A non-transitory computer-readable recording medium storing therein a position estimation program according to the present disclosure is provided, the program causing a stationary radio device to perform processing including: measuring and recording a first fingerprint at a first timing; calculating a first similarity between the first fingerprint and a second fingerprint measured by a mobile radio device at a second timing and transmitted from the mobile radio device; receiving, from another radio device, a second similarity between a third fingerprint measured by the other stationary radio device at the first timing and the second fingerprint; and determining a position of the mobile radio device based on a comparison result between the first similarity and the second similarity.

A stationary radio device according to the present disclosure includes: control circuitry, which, in operation, calculates a first similarity between a first fingerprint measured by the stationary radio device at a first timing and a second fingerprint measured by a mobile radio device at a second timing and transmitted from the mobile radio device; and communication circuitry, which, in operation, receives, from another radio device, a second similarity between a third fingerprint measured by the other stationary radio device at the first timing and the second fingerprint, wherein the control circuitry determines a position of the mobile radio device based on a comparison result between the first similarity and the second similarity.

A position estimation method for a mobile radio device according to the present disclosure includes: transmitting a second fingerprint measured by the mobile radio device at a second timing, to a plurality of stationary radio devices; receiving, from the plurality of stationary radio devices, a plurality of similarities between a plurality of fourth fingerprints measured by the plurality of stationary radio devices at a first timing and the second fingerprint; and determining a position of the mobile radio device based on the plurality of similarities.

A non-transitory computer-readable recording medium storing therein a position estimation program according to the present disclosure is provided, the program causing a mobile radio device to perform processing including: transmitting a second fingerprint measured by the mobile radio device at a second timing, to a plurality of stationary radio devices; receiving, from the plurality of stationary radio devices, a plurality of similarities between a plurality of fourth fingerprints measured by the plurality of stationary radio devices at a first timing and the second fingerprint; and determining a position of the mobile radio device based on the plurality of similarities.

A mobile radio device according to the present disclosure includes: transmission circuitry, which, in operation, transmits a second fingerprint measured by the mobile radio device at a second timing, to a plurality of stationary radio devices; reception circuitry, which, in operation, receives, from the plurality of stationary radio devices, a plurality of similarities between a plurality of fourth fingerprints measured by the plurality of stationary radio devices at a first timing and the second fingerprint; and control circuitry, which, in operation, determines a position of the mobile radio device based on the plurality of similarities.

The disclosure of Japanese Patent Application No. 2019-228065, filed on Dec. 18, 2019, including the specification, drawings and abstract, is incorporated herein by reference in its entirety.

INDUSTRIAL APPLICABILITY

The present disclosure is applicable to a position estimation system using a fingerprint of radio communication.

REFERENCE SIGNS LIST

1 Position estimation system
11 Radio communicator
12 Controller
13 Input/output
14 Memory
50 Packet
101 to 105 Radio terminal
501 Destination address
502 Transmission source address
504 Sequence number
505 Query field
506 Response field
600 Fingerprint
700 Saved fingerprint

The invention claimed is:
1. A position estimation method for a stationary radio device, the method comprising:
 calculating a first similarity between a first fingerprint measured by the stationary radio device at a first timing and a second fingerprint measured by a mobile radio device at a second timing and transmitted from the mobile radio device;
 receiving, from another stationary radio device, a second similarity between a third fingerprint measured by the other stationary radio device at the first timing and the second fingerprint; and
 determining, a position of the mobile radio device based on a comparison result between the first similarity and the second similarity.
2. The position estimation method according to claim 1, wherein:
 the first fingerprint is recorded by the stationary radio device at the first timing in a case where a distance between the mobile radio device and the stationary radio device is shorter than a distance between the mobile radio device and the other stationary radio device; and
 the third fingerprint is recorded by the other stationary radio device at the first timing in a case where the distance between the mobile radio device and the other stationary radio device is shorter than the distance between the mobile radio device and the stationary radio device.

3. The position estimation method according to claim 1, wherein:
the first timing is determined according to a signal output from input/output circuitry provided in the stationary radio device; and
the stationary radio device measures and records the first fingerprint at the first timing.

4. The position estimation method according to claim 1, wherein:
the first timing is determined according to a signal transmitted from the mobile radio device; and
the stationary radio device measures and records the first fingerprint at the first timing.

5. The position estimation method according to claim 1, wherein the stationary radio device transmits the first similarity to the other stationary radio device.

6. The position estimation method according to claim 1, further comprising, in a case where the first similarity calculated by the stationary radio device is a similarity higher than the second similarity received from the other stationary radio device, determining a distance between the mobile radio device and the stationary radio device is shorter than a distance between the mobile radio device and the other stationary radio device.

7. A non-transitory computer-readable recording medium storing therein a position estimation program, the program causing a stationary radio device to perform processing comprising:
measuring and recording a first fingerprint at a first timing;
calculating a first similarity between the first fingerprint and a second fingerprint measured by a mobile radio device at a second timing and transmitted from the mobile radio device;
receiving, from another stationary radio device, a second similarity between a third fingerprint measured by the other stationary radio device at the first timing and the second fingerprint; and
determining a position of the mobile radio device based on a comparison result between the first similarity and the second similarity.

8. A stationary radio device; comprising:
control circuitry, which, in operation, calculates a first similarity between a first fingerprint measured by the stationary radio device at a first timing and a second fingerprint measured by a mobile radio device at a second timing and transmitted from the mobile radio device; and
communication circuitry, which, in operation, receives, from another stationary radio device, a second similarity between a third fingerprint measured by the other stationary radio device at the first timing and the second fingerprint,
wherein the control circuitry determines a position of the mobile radio device based on a comparison result between the first similarity and the second similarity.

9. A position estimation method for a mobile radio device, the method comprising:
transmitting a second fingerprint measured by the mobile radio device at a second timing, to a plurality of stationary radio devices;
receiving, from the plurality of stationary radio devices, a plurality of similarities between a plurality of first fingerprints measured by the plurality of stationary radio devices at a first timing and the second fingerprint; and
determining a position of the mobile radio device based on the plurality of similarities.

10. A non-transitory computer-readable recording medium storing therein a position estimation program, the program causing a mobile radio device to perform processing comprising:
transmitting a second fingerprint measured by the mobile radio device at a second timing, to a plurality of stationary radio devices;
receiving, from the plurality of stationary radio devices, a plurality of similarities between a plurality of first fingerprints measured by the plurality of stationary radio devices at a first timing and the second fingerprint; and
determining a position of the mobile radio device based on the plurality of similarities.

11. A mobile radio device; comprising:
transmission circuitry, which, in operation, transmits a second fingerprint measured by the mobile radio device at a second timing, to a plurality of stationary radio devices;
reception circuitry, which, in operation, receives, from the plurality of stationary radio devices, a plurality of similarities between a plurality of first fingerprints measured by the plurality of stationary radio devices at a first timing and the second fingerprint; and
control circuitry, which, in operation, determines a position of the mobile radio device based on the plurality of similarities.

* * * * *